United States Patent
Tuo et al.

(10) Patent No.: US 10,181,222 B2
(45) Date of Patent: Jan. 15, 2019

(54) METHOD AND DEVICE FOR AUGMENTED REALITY DISPLAY OF REAL PHYSICAL MODEL

(71) Applicant: HiScene Information Technology Co., Ltd., Shanghai (CN)

(72) Inventors: Yuxiang Tuo, Shanghai (CN); Jiayi Jiang, Shanghai (CN); Xuebin Zhao, Shanghai (CN); Dawei Shen, Shanghai (CN)

(73) Assignee: HISCENE INFORMATION TECHNOLOGY CO.,LTD, Shanghai (CN)

( * ) Notice: Subject to any disclaimer, the term of this patent is extended or adjusted under 35 U.S.C. 154(b) by 91 days.

(21) Appl. No.: 15/487,449

(22) Filed: Apr. 14, 2017

(65) Prior Publication Data
US 2018/0247456 A1     Aug. 30, 2018

(30) Foreign Application Priority Data

Feb. 27, 2017 (CN) .......................... 2017 1 0108466

(51) Int. Cl.
| | |
|---|---|
| *G06T 19/00* | (2011.01) |
| *G06T 7/00* | (2017.01) |
| *G06F 3/01* | (2006.01) |
| *G06K 9/46* | (2006.01) |
| *G06T 17/05* | (2011.01) |
| *G06F 3/16* | (2006.01) |

(52) U.S. Cl.
CPC .......... *G06T 19/006* (2013.01); *G06K 9/4609* (2013.01); *G06T 7/00* (2013.01); *G06T 17/05* (2013.01); *G06F 3/012* (2013.01); *G06F 3/017* (2013.01); *G06F 3/167* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2009/0129630 A1* | 5/2009 | Gloudemans | ........... | G06T 15/20 382/103 |
| 2013/0286004 A1* | 10/2013 | McCulloch | ........... | G06T 19/006 345/419 |

(Continued)

FOREIGN PATENT DOCUMENTS

| | | | | |
|---|---|---|---|---|
| CN | 108136257 | * | 6/2018 | ........... A63F 13/213 |

OTHER PUBLICATIONS

"Virtual Tactical Map with Tangible Augmented Reality Interface", by Jung et al., 2008 International Conference on Computer Science and Software Engineering, pp. 1170-1173, Dec. 12-14, 2008. (Year: 2008).*

(Continued)

*Primary Examiner* — James A Thompson
(74) *Attorney, Agent, or Firm* — Jun He Law Offices P.C.; James J. Zhu

(57) ABSTRACT

The present disclosure relates to a method and device for augmented reality display of real physical model. By adopting the method and/or device of the present disclosure, the real physical model may be combined with its virtual physical model, and the display of the physical model may become more vivid with the help of AR technology.

24 Claims, 9 Drawing Sheets

(56) References Cited

U.S. PATENT DOCUMENTS

| | | | | |
|---|---|---|---|---|
| 2015/0130790 A1* | 5/2015 | Vasquez, II | ........... | G06T 19/006 345/419 |
| 2015/0301599 A1* | 10/2015 | Miller | ..................... | G06F 3/011 345/156 |
| 2017/0053447 A1* | 2/2017 | Chen | ..................... | G06T 19/006 |
| 2018/0089899 A1* | 3/2018 | Piemonte | ............. | G01C 21/365 |

OTHER PUBLICATIONS

"Digital Sand Model Using Virtual Reality Workbench", by Syed et al., 2012 International Conference on Computer Communication and Informatics, pp. 1-6, Jan. 10-12, 2012. (Year: 2012).*

"An Optical See-Through Augmented Reality System with Gesture-Based Interaction", by Zhen et al., 2016 International Conference on Virtual Reality and Visualization, pp. 447-452, Sep. 24-26, 2016. (Year: 2016).*

"Virtual reality realization technology and its application based on augmented reality", by Ning Li et al., 2017 IEEE Global Conference on Signal and Information Processing (GlobalSIP), Nov. 14-16, 2017, pp. 1383-1387 (Year: 2017).*

* cited by examiner

METHOD AND DEVICE FOR AUGMENTED REALITY DISPLAY OF REAL PHYSICAL MODEL

CROSS REFERENCE TO RELATED APPLICATIONS

This application claims priority to Chinese Patent Application Number 201710108466.7 filed on Feb. 27, 2017, the entire contents of which are incorporated herein by reference.

TECHNICAL FIELD

The present disclosure relates to a method and device for augmented reality display of real physical model.

BACKGROUND ART

Virtual Reality and Augmented Reality (VR/AR)

Virtual Reality (VR) is a type of human-computer interaction using computer and sensor technology. VR generates a virtual environment with realistic images, sounds and other sensations that replicate a real environment (or create an imaginary setting) to simulate a user's physical presence in this environment, and to interact with the environment.

Augmented Reality (AR) is a live view direct or indirect of a physical, real-world environment whose elements are augmented (or supplemented) by computer-generated sensory input such as sound, video, graphics or GPS data. AR computes the real-time position and angle of a camera, and adds corresponding images, videos, etc., to combine a virtual environment with the real-world environment and provide interaction between users and the environment. For example, in monitor-based AR, the computing device combines real world images captured by a camera with the virtual environment generated by the computing device, and outputs the combined view on the display for users.

Hardware components for AR usually include processor, display device, sensors and input devices. Suitable display devices may include head-mounted display (HMD), eyeglasses or monitors of computing devices such as smartphones and tablet computers. For example, HMDs use sensors to allow the system to align virtual information with the physical world and adjust accordingly with the user's head movements. Eyeglasses often use cameras to intercept the real world view and re-display its augmented view through the eye pieces.

With continuous improvement of the computation ability of portable electronic products, augmented reality is now widely used in various fields.

Simultaneous Localization and Mapping (SLAM)

In order to allow a user to "wander" in a virtual or augmented environment, one needs to consider the moving of a user wearing an AR/VR device. In this situation, the AR/VR device can be regarded as a robot, which leads to the problem of vision recognition. Simultaneous Localization and Mapping (SLAM) solves the problem. SLAM helps a robot locate itself while moving based on its estimated location and the map, and build an incremental map of the environment to achieve self-location and navigation. In AR/VR, location information may be provided by SLAM, and an AR/VR device may build a map and generate an environment using the map.

With continuous improvement of AR/VR technologies, it is proposed to apply AR/VR to real physical model display, for example, to sand table display.

Sand table display is needed in various fields, such as military affairs, real estate, education, etc., as an important way to convey information. However, traditional sand table display has its drawbacks.

First, the cost of traditional sand tables is relatively high, and it is difficult to be modified in real-time. Second, traditional sand tables need to be presented in the same physical space with the audience and therefore is not suitable for remote presentation. Third, traditional sand tables have limited interaction methods with audiences or operators.

On the other hand, virtual sand table display based on VR/AR may be employed. Usually, a virtual sand table is overlapped on a plane surface, and the audience need to wear special devices (for example, special helmet or glasses) to watch the virtual or augmented effect. This kind of display has high demands on devices, and does not support simultaneous watch of a plurality of people.

Therefore, the present disclosure proposes to combine virtual information into real physical model (such as, a sand table) using AR technology. In this way, the virtual physical model may be combined with the real physical model to provide a more vivid display of the real physical model.

SUMMARY

According to one aspect of the present disclosure, a method for augmented reality display of real physical model is proposed. The method comprises: an initialization step, comprising providing a real physical model, obtaining a virtual model from the real physical model using 3D reconstruction, combining the virtual model and the real physical model; and an augmented reality display step, for displaying an augmented reality scene of the real physical model by at least one display device.

According to another aspect of the present disclosure, a system for augmented reality display of real physical model is proposed. The system comprises: a virtual model construction device, for constructing a virtual model from a real physical model using 3D reconstruction; a combination device, for combining the virtual model and the real physical model; and an augmented reality display device, for displaying an augmented reality scene of the real physical model.

It is to be understood that both the foregoing general description and the following detailed description are exemplary and explanatory only, and are not restrictive of the invention.

BRIEF DESCRIPTION OF THE DRAWINGS

In order to illustrate the solutions of embodiments of the present disclosure more clearly, the drawings used in connection with the embodiments will be briefly described below. It should be understood that the following drawings illustrate only certain embodiments of the present disclosure, and the scope of the present disclosure is not limited thereto. In the drawings.

EMBODIMENTS OF THE INVENTION

The present disclosure will now be described more comprehensively hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With reference to the accompanying drawings, a method and device for displaying a real physical model based on AR technology will now be described in detail in relation to a sand table, which serves as a non-limiting example of the present disclosure.

According to one embodiment of the present disclosure, the method comprises in general an initialization phase and an AR display phase. Now, each phase will be described in detail.

Initialization Phase

In this phase, it rebuilds a virtual sand table based on the real sand table using 3D reconstruction technology, and then combine the virtual sand table with the real sand table.

Figure 1:
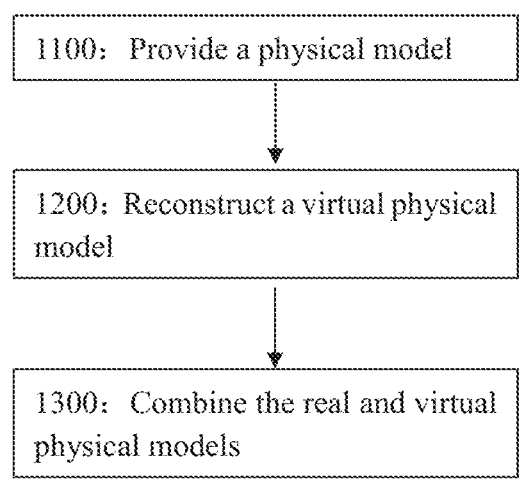
FIG. 1 shows the specific steps in the initialization phase.

FIG. 1 shows the specific steps in this phase, and each step will now be described in detail.

Step 1100, providing a real sand table.

In this step, a user may design a real sand table according to actual needs.

Figure 2:
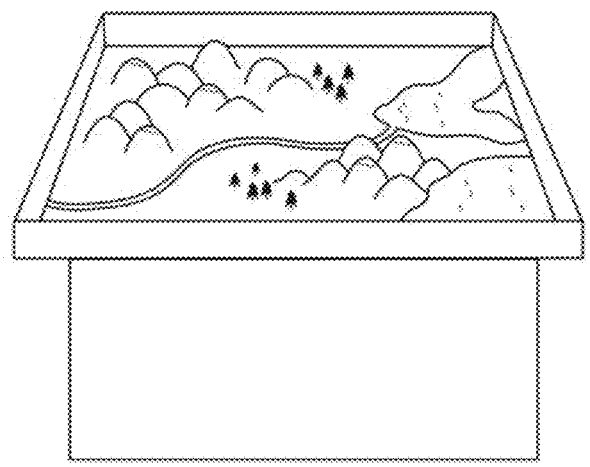
FIG. 2 shows an exemplary real sand table.

FIG. 2 shows an exemplary sand table, which shows the geographic information of North China Plain.

Take the sand table shown in FIG. 2 as an example, the sand table may be made using frame, stool, sand, mud, landmarks, etc. The steps for manufacturing the sand table may comprise: Setting a sand table by disposing sands within the frame and flattening and compressing the sand to create a plane with the lowest contour line; Building landform by drawing locations of mountain tops, mountain pass, rivers and the like, and stacking sands to a certain level to represent these locations; and Providing landmarks by disposing markers indicating the name of the region, river, mountain and the like on corresponding positions.

Step 1200, reconstructing a virtual sand table using 3D reconstruction technology.

In this step, it uses a camera to scan the real sand table provided in Step 1100, and then uses 3D reconstruction technology to obtain a corresponding virtual sand table.

In one example, it reconstructs a 3D model using ToF (Time of Flight) camera. ToF camera resolves distance by measuring the time-of-flight of a light signal between the camera and the subject for each point of the image. More specifically, it continuously transmits light pulses to an object, and then receives lights returned from the object using sensors. The distance to the object can be obtained by calculating the time of flight of the light pulses. In this embodiment, it uses a ToF camera to scan the real sand table and captures the 3D data of the whole scene. Then, it rebuilds a 3D model under a unitary coordinate based on the 3D data.

According to another example, it reconstructs a 3D model based on images. 3D Reconstruction based on images generally comprises of following steps:

Obtaining images: it uses a camera to obtain 2D images of a 3D object;

Calibrating the camera: by calibrating the camera, it builds an imaging model and determines the position and parameters of the camera so as to determine the relationship between the space coordinate of the 3D object and its pixel;

Extracting the features: based on feature extraction algorithms, it extracts features such as point features, line features or regional features of the 3D object;

Stereo matching: based on the extracted features, it builds corresponding relations between 2D images; in other words, it matches the different image points of the same physical spatial point in two or more 2D images;

3D reconstruction: based on a relatively accurate matching result and with reference to the calibration parameters of the camera, it reconstructs the 3D model of the object.

It should be understood that other 3D reconstruction technologies may be used and are also included in the scope of the present disclosure.

Figure 3:
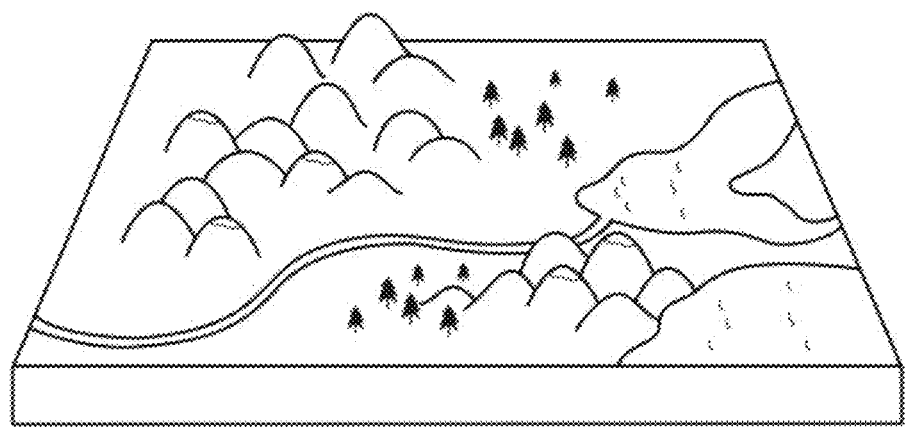
FIG. 3 shows the virtual sand table obtained from the real sand table of FIG. 2 using 3D reconstruction.

FIG. 3 shows the virtual sand table obtained by 3D reconstruction of the real sand table of FIG. 2.

Step 1300, combining the real sand table and the virtual sand model.

Figure 4:
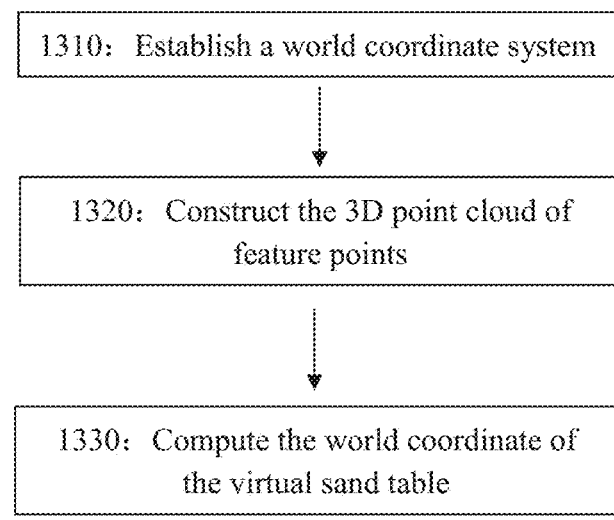
FIG. 4 shows the specific steps in the virtual-real sand tables combination step.

FIG. 4 shows the specific steps of combining the real sand table with the virtual sand table. Each step will now be described in detail.

Step 1310, building a world coordinate system.

In this step, it disposes a 2D identification graph on the real sand table. For example, it disposes an identification graph in the same plane as the main plane of the real sand table, and then fixes the relative position between the identification graph and the real sand table.

Then, it builds a world coordinate system based on the identification graph. For example, the origin of the world coordinate system may be located on the center of the identification graph, and the x-y plane of the world coordinate system may be within the plane where the identification graph lies.

Figure 5:
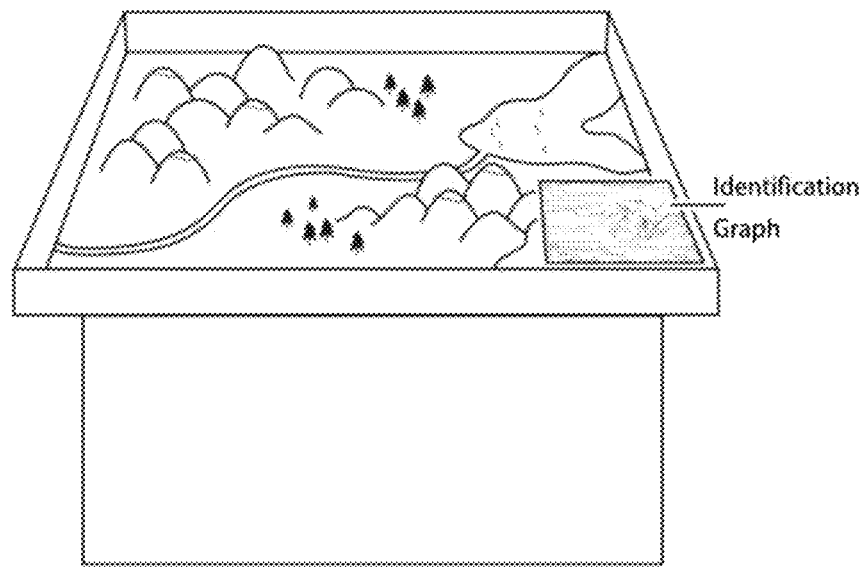
FIG. 5 shows the real sand table disposed with an identification graph.

FIG. 5 shows the real sand table with an identification graph disposed thereon, wherein the grey image in the bottom right corner is the identification graph.

Step 1320, establishing the 3D point cloud of the feature points.

In this step, it uses a camera to scan the real sand table, and calculates the 3D coordinate of the feature points extracted from the real sand table under the world coordinate system obtained in step 1310. Then, it stores the calculated point cloud.

Here, feature points refer to the significant points in the image. For example, for real sand table, its feature points may include mountain peaks or valleys that change significantly, or cities or sights that need to be displayed during presentation.

In this embodiment, it uses ORB (Oriented FAST and Rotated BRIEF) to extract feature points. The ORB is proposed in an article named "ORB: An Efficient Alternative to SIFT or SURF" by Ethan Rublee, Vincent Rabaud, Kurt Konolige and Gary R. Bradski in 2011.

ORB is a fusion of FAST keypoint (i.e. feature point) detector and BRIEF (Binary Robust Independent Elementary Features) descriptor with modifications to enhance the performance.

For detectors, ORB uses FAST to find keypoints, then applies Harris corner measure to find top N points among them. It also uses pyramid to produce multiscale-features. To allow FAST to compute the orientation, it computes the intensity weighted centroid of the patch with located corner at center. The direction of the vector from this corner point to centroid gives the orientation. To improve the rotation invariance, moments are computed with x and y which should be in a circular region of radius r, where r is the size of the patch.

For descriptors, ORB uses BRIEF descriptors. ORB "steers" BRIEF according to the orientation of keypoints. For any feature set of n binary tests at location $(x_i, y_i)$, it defines a 2×n matrix S which contains the coordinates of these pixels. Then, using the orientation of patch θ, it find its rotation matrix and rotates the S to get the steered (rotated) version $S_θ$.

It should be understood that other algorithms for extracting feature points may also be used, and are also included in the present disclosure.

Then, in order to match the feature points and establish a corresponding relation between two consecutive images, the Hamming distances between each feature point in a second image and all of the feature points in a first image are calculated. The calculated Hamming distance may be referred to as $D(V_p, V_q)$, wherein $V_p$ is the feature vector of a certain feature point p in the second image, and $V_q$ is the feature vector of the closest feature point q in the first image. The smaller the $D(V_p, V_q)$ is, the more similar the two feature points are. The two points with the minimum Hamming distance form a pair.

After matching the feature points, the movement of the camera may be estimated. Then, based on the estimated moving information, it computes the spatial position of each feature point. In other words, it computes the 3D coordinate of each feature point under the world coordinate system so as to establish the 3D point cloud of the feature points.

Figure 6:
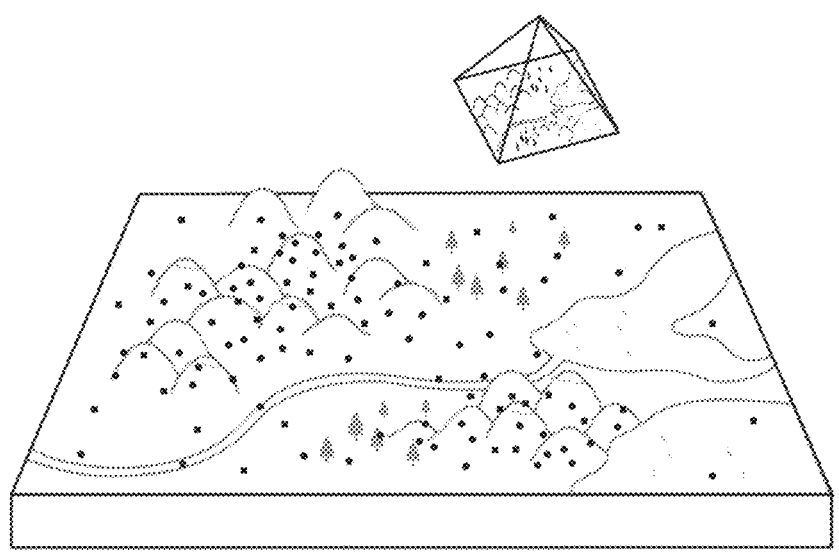
FIG. 6 shows the 3D point cloud computed with reference to the real sand table of FIG. 5.

FIG. 6 shows the 3D point cloud computed with reference to the real sand table of FIG. 5.

Step 1330, computing the world coordinate of the virtual sand table.

In this step, based on the relative position of the identification graph and the real sand table, it computes the coordinate of the virtual sand table under the world coordinate system obtained in step 1310.

More specifically, first, it computes the conversion coefficient between the real physical world size and the algorithm's pixel size; then, it measures the relative position between the center of the identification graph and the center of the real physical model; lastly, it converts the relative position to corresponding pixel size and obtains the world coordinate of the virtual sand table.

Then, it disposes the virtual sand table into the corresponding world coordinate system and aligns the virtual sand table with the real sand table, so that their origins, directions and sizes coincide. In this way, the virtual sand table and the real sand table are combined.

Figure 7:
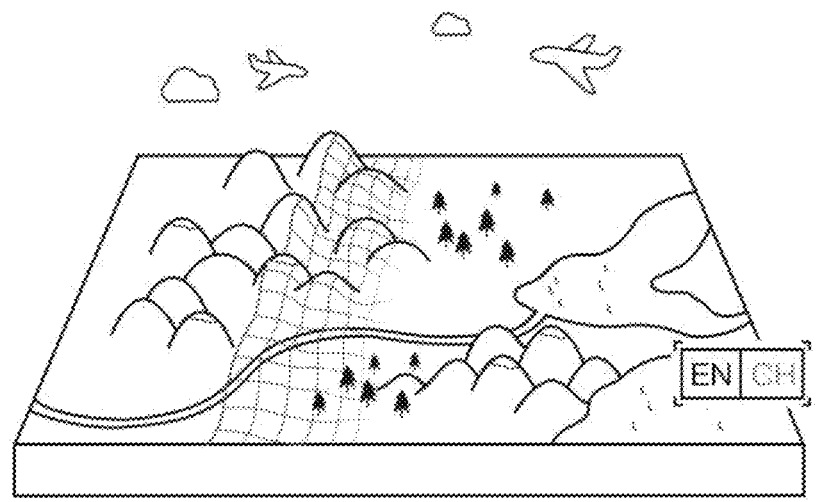
FIG. 7 shows the combined real and virtual sand tables.

FIG. 7 shows the combined sand table.

It should be noted that although in the present embodiment, it computes the world coordinate of the virtual sand table after establishing the 3D point cloud, in other embodiments the world coordinate of the virtual sand table may be computed before establishing the 3D point cloud. For example, Step 1320 and Step 1330 may be conducted consecutively, reversely or independently.

AR Display Phase

In this phase, the combined sand table is displayed on at least one terminal device to show related information.

Figure 8:
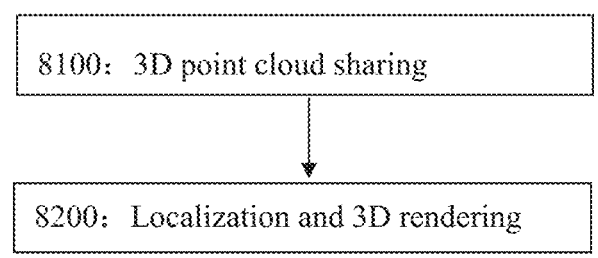
FIG. 8 shows the specific steps in the augmented reality display phase.

FIG. 8 shows the specific steps in the AR display phase.

Step 8100, 3D point cloud sharing.

In this step, it sends the 3D point cloud obtained in step 1320 to at least one terminal device. Here, the terminal device may be a PC, a mobile phone or a VR/AR glasses, etc.

Step 8200, localization and 3D rendering.

According to one example, in this step, each terminal device uses SLAM algorithm to locate itself while moving, and conducts corresponding 3D rendering. More specifically, the camera of the terminal device may be regarded as the robot in SLAM algorithm. Each device computes a location estimation and a map of the environment based on the 3D point cloud determined in step 1320. Then, based on the computation result, it completes the 3D rendering of the virtual sand table.

This step ensures that the virtual sand table and the real sand table match in real time. In this way, each device running the SLAM algorithm independently may display the same virtual scene.

According to one embodiment of the present disclosure, two or more terminal devices (for example, PC, mobile phone and AR/VR glasses) may be connected to a common network and display the virtual scene simultaneously.

According to another embodiment of the present disclosure, one of the plurality of terminal devices may be selected as the master device, which controls and interacts with the AR scene. Other devices served as slave devices may synchronize with the master device and display the same AR scene controlled by the master device. For example, the operation of the master device may be converted into a specific format and sent to other slave devices. In this way, the plurality of terminal devices may perform the same operation.

According to yet another embodiment of the present disclosure, at least one terminal device may be placed close to the location where the real physical model lies, or be placed distant from the location where the real physical model lies.

Moreover, according to one embodiment of the present disclosure, interactive AR display may be performed according to actual needs. Interactive AR display may include visual interaction, voice interaction or gesture interaction, etc.

Figure 9A:
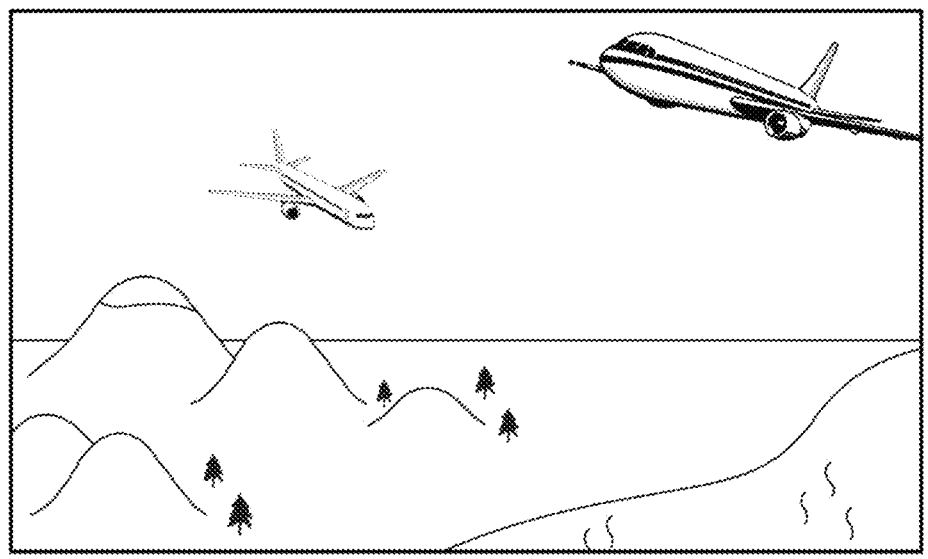
FIG. 9A and FIG. 9B show exemplary interactive scenarios of the combined sand table.
Figure 9B:
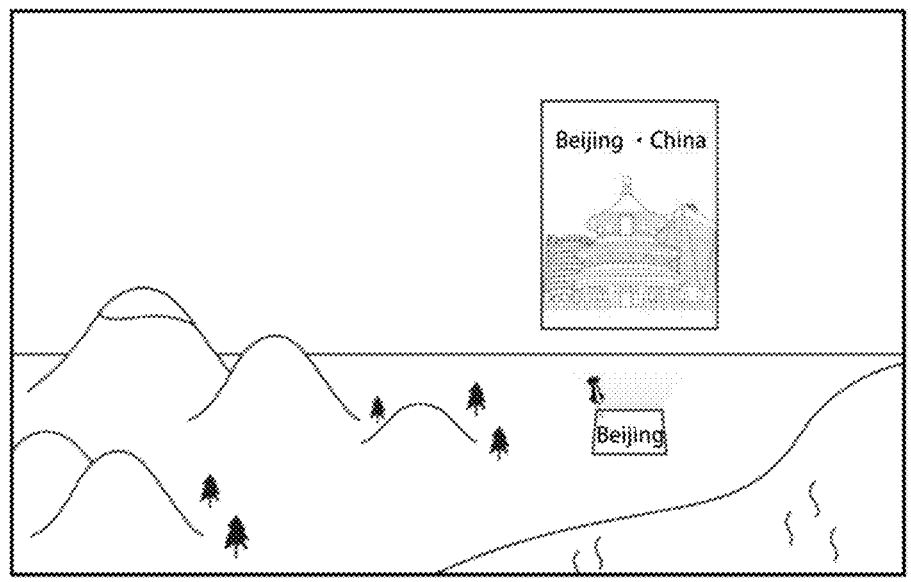

FIG. 9A and FIG. 9B show exemplary interactive scenarios of the combined sand table.

As shown in FIG. 9A, after combining the real and virtual sand tables, the sea displayed on the terminal device may be moving, with boats sailing thereon and planes flying in the sky.

As shown in FIG. 9B, markers are displayed above main cities and sights. By clicking the markers or saying the name of the city or sight, said city or sight may be selected, and a window showing pictures and information of the city or sight will be displayed on the terminal device.

Moreover, take the virtual geographic sand table in this embodiment for example, it may display geographic information including ocean, atmosphere and chemical substances. A user may interact with the virtual sand table by saying "ocean", "atmosphere", "chemical substance", for example, and the AR scene displayed on the virtual sand table will change accordingly.

Figure 10:
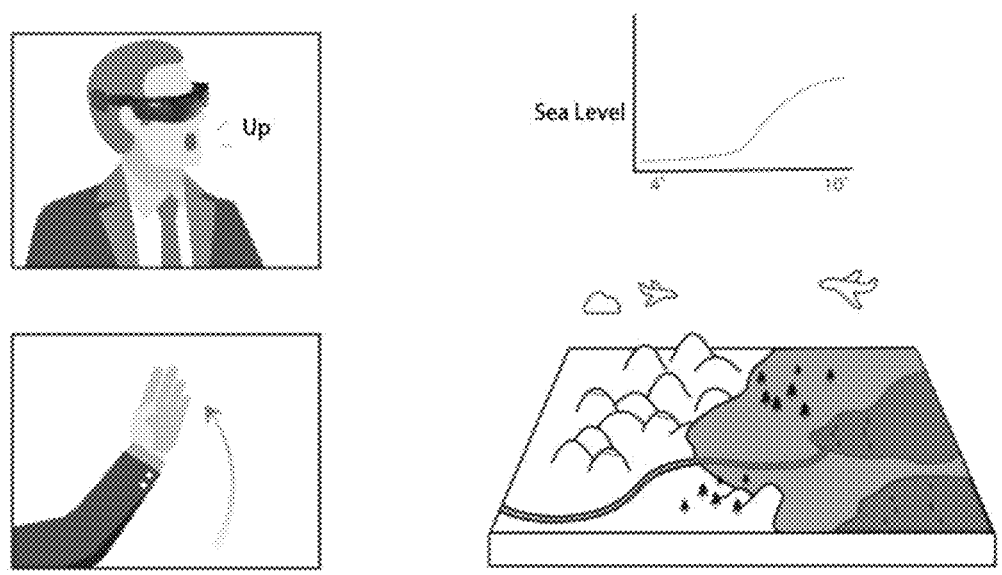
FIG. 10 shows an interactive control example based on an ocean scenario of the sand table.

FIG. 10 shows an interactive control example based on an ocean scenario of the sand table.

It is known that the sea level will raise 4-5 meters when the global average temperature increases by 1° C. The ocean scenario may show how global warming influences the sea level. During presentation, when the operator waves up his/her hand or says "up", for example, it represents that the global average temperature increases by 1° C. Consequently, the sea level of the AR scene displayed on the terminal device will go up and submerge part of the land. Similarly, when the operator waves down his/her hand or says "down", for example, it represents that the global average temperature decreases by 1° C. Consequently, the sea level of the AR scene displayed on the terminal device will go down and reveal part of the land. In this way, the operator may control the sand table via voice or gesture and the audiences may see the change of landform on their terminal devices.

Figure 11:
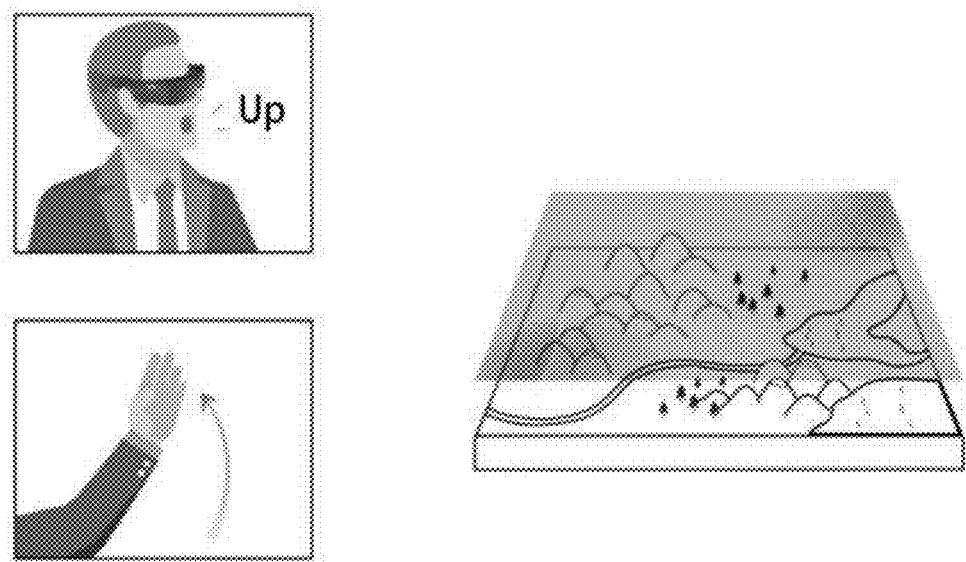
FIG. 11 shows an interactive control example based on an atmosphere scenario of the sand table.

FIG. 11 shows an interactive control example based on an atmosphere scenario of the sand table.

The atmosphere scenario may show the general atmospheric circulation at different heights from ground surface to high-speed air flow layer (e.g. 1000 hpa, 750 hpa, 500 hpa and 250 hpa), as well as atmospheric information including airflow, temperature, humidity, etc.

As shown in FIG. 11, the operator may select the air flow layer and atmospheric information to be displayed via voice instructions (e.g., voice command "up") or gesture command, and the audience may see the general atmospheric circulation and atmospheric information in this layer on their terminal devices.

Figure 12:
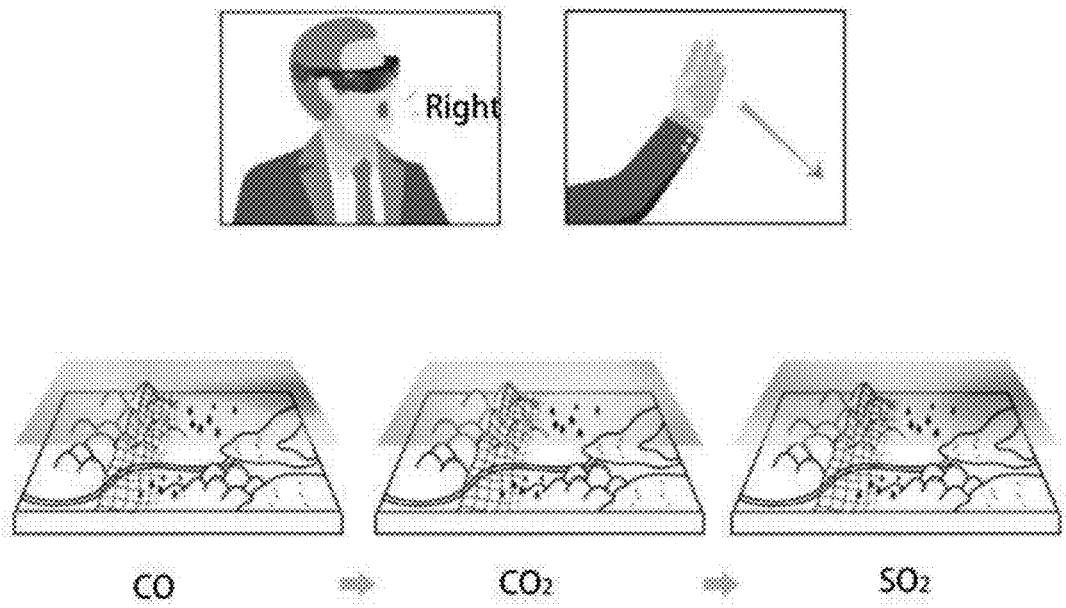
FIG. 12 shows an interactive control example based on a chemical substance scenario of the sand table.

FIG. 12 shows an interactive control example based on a chemical substances scenario of the sand table.

Chemical substances scenario may show the distribution of chemical substances at different heights from ground surface to high-speed air flow layer (e.g. 1000 hpa, 750 hpa, 500 hpa and 250 hpa). The distribution of CO, $CO_2$, $SO_2$, for example, may be displayed.

As shown in FIG. 12, the operator may select the air flow layer and chemical substance to be displayed via voice instructions (e.g., voice command "up") or gesture command, and the audiences may see the distribution of chemical substances in this layer on their terminal devices.

In one embodiment of the present disclosure, the terminal device may be AR glasses.

Figure 13:
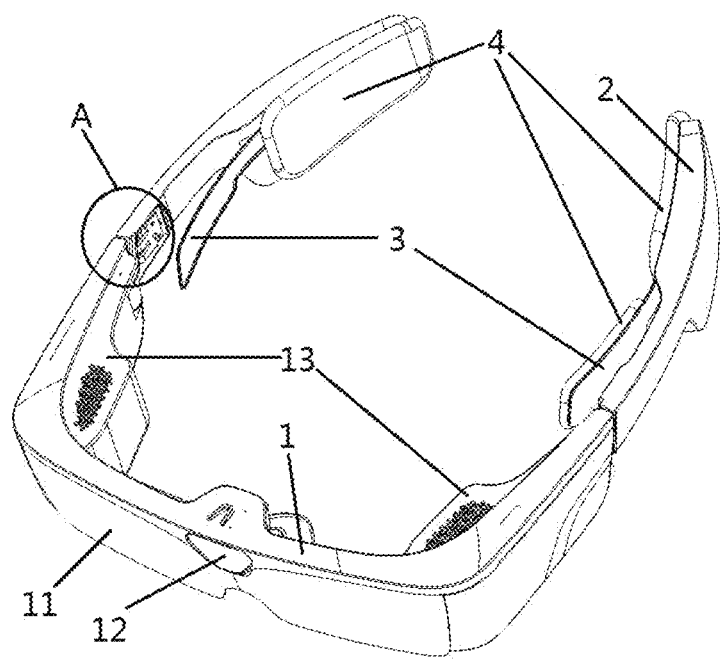
FIG. 13 shows an AR glasses device applied to the device of the present disclosure.

FIG. 13 shows the AR glasses applied to the system of the present disclosure. The AR glasses may be used to watch and control the AR scene based on the real physical model.

As shown in FIG. 13, the AR glasses may include a glasses frame 1, a pair of glasses legs 2, a pair of clamping members 3 and soft supporting layers 4. With the help of these components, the AR device may be stably held on the user's head. Each of the glasses legs 2 is mounted on one side of the glasses frame 1 respectively, and the end of each of the glasses legs 2 bends inwardly to form a first arc portion. The clamping member comprises an elastic clamping element 3, which is disposed on an inner side of the glasses legs 2. The end of the elastic clamping element 3 bends inwardly to form a second arc portion. Moreover, the elastic clamping element 3 may be made of stainless steel shrapnel, which may reinforce the clamping force of the glasses legs 2. The soft support layers 4 may be placed on the inner side of the arc portion, and may be made of rubber layers and/or foam layers. With the soft supporting layers 4, user comfortability can be improved. For example, the pressure on the user's head may be reduced, and the friction between the glasses legs and the user's head may be increased. In this way, the AR glasses will be more stable and comfortable to wear.

In addition, the AR glasses may further include lightshading lenses 11 disposed on the glasses frame 1, a depth camera module 12 disposed at the center portion of the glasses frame 1, and a light emitting module 13 disposed at each lateral portion of the glasses frame 1. The depth camera module 12 and the light emitting module 13 are coupled to a control circuit, and the light emitting module 13 is in optical connection with the imaging lenses disposed behind the light-shading lenses 11. For a user who wears the AR glasses, the imaging lenses function as a display screen. From said imaging lenses, display content of the AR glasses, such as a graphic user interface, may be observed. The imaging lenses may be, for example, semi-transparent and semi-reflective lenses/films, or holographic diffraction waveguide gratings, or other suitable imaging components.

Wearing the AR glasses, a user may watch the virtual physical model displayed on the imaging lens (screen), and the real physical model via imaging lens and light-shading lenses 11. In other words, AR glasses may overlay the AR scene onto the real scene. In addition, the AR glasses may detect the shape or color of the real physical model via the depth camera module 12 and/or other camera modules, as well as detect gestures or other operations of the user.

It should be understood that the AR device of the present disclosure is not limit to AR glasses, and other AR devices, such AR helmets are also included in the scope of the present disclosure.

It should also be understood that in other embodiments, the AR device may also include other modules for detecting the user's operations, such as microphones, inertia sensors, etc. These modules may detect gesture signals, voice signals, head movement signals respectively, as so to determine the user's operation.

It should also be understood that the present disclosure is not limited to sand table AR interaction/display. The technical solution disclosed in the application may be applied to any physical models/objects, suitable to entertainment needs of personal consumers or to industrial needs of manufacturing, transporting, etc. For example, it may be applied in in-door environment or out-door public area, in education, industry, tourism, everyday-life, etc.

Technical Effects

The method and device for augmented reality display of real physical model has the following beneficial effects:

By adopting the method and/or device of the present disclosure, the real physical model may be combined with its virtual physical model, and the display of the physical model may become more vivid with the help of AR technology. Moreover, it allows the users to watch the same AR scene at different places and control the AR scene by various forms of interactions (e.g. via voice, gestures, etc.).

In addition, the method and/or device of the present disclosure allows a plurality of users to interact with the virtual scene via a plurality terminal devices. It also allows different terminal devices to share the same AR scene, making it suitable for remote display.

What is claimed is:

1. A method for augmented reality display of a real physical model, comprising:

an initialization step, comprising:
　providing a real physical model, wherein the real physical model is a model that occupies a real physical space;
　obtaining a virtual model from the real physical model using 3D reconstruction;
　combining the virtual model and the real physical model, wherein combining the virtual model and the real physical model further comprises:
　　a world coordinate system establishing step, for establishing a world coordinate system based on an identification graph, said identification graph being disposed adjacent to the real physical model, wherein a relative position between the identification graph and the real physical model is fixed, wherein the identification graph is a 2D graph and a direction information of the identification graph corresponds to a direction information of the real physical model; and
　　a virtual model world coordinate computing step, for computing the world coordinate of the virtual model under the established world coordinate system; and
　an augmented reality display step, for displaying an augmented reality scene of the real physical model by at least one display device.

2. The method of claim 1, the initialization step further comprises:
　a 3D point cloud constructing step, comprising: extracting a plurality of feature points of the real physical model, and computing the 3D coordinates of the plurality of feature points under the world coordinate system so as to form the 3D point cloud.

3. The method of claim 2, wherein the augmented reality display step further comprises:
　a 3D point cloud sharing step, for sending the 3D point cloud to the at least one display device;
　a locating step, for locating movement of the at least one display device; and
　a 3D rendering step, for rendering the virtual model displayed by the at least one display device based on the located movement thereof.

4. The method of claim 1, wherein a center of the identification graph is used as an origin of the world coordinate system, wherein the virtual model world coordinate computing step further comprises:
　computing a conversion coefficient between the real physical model's size and the algorithm's pixel size;
　measuring the relative position between the center of the identification graph and the center of the real physical model; and
　computing the world coordinate of the virtual model by converting the relative position to corresponding pixel size.

5. The method of claim 1, wherein obtaining a virtual model from the real physical model using 3D reconstruction further comprises:
　an image obtaining step, for obtaining 2D images of the real physical model;
　a calibrating step, for determining corresponding relations between the real physical model's size and the pixel size of 2D images;
　a feature extraction step, for extracting features of the real physical model;
　a stereo matching step, for establishing matching results between 2D images based on said extracted features;
　a 3D reconstruction step, for reconstructing a virtual model of the real physical model based on the matching results and the corresponding relations.

6. The method of claim 1, further comprising:
　an augmented reality scene controlling step, for allowing a user to control the augmented reality scene.

7. The method in claim 6, wherein said control comprises:
　at least one of gesture, voice, or head movement of a user that is detectable by the at least one display device.

8. The method in claim 7, wherein the at least one display device comprises:
　a master device and at least one slave device, wherein the master device controls the augmented reality scene, wherein each of the master device and at least one slave device is capable of displaying the augmented reality scene of the real physical model.

9. The method in claim 8, further comprising:
　receiving data from the master device, by the at least one slave device, and
　displaying the augmented reality scene based on the data received from the master device, by the at least one slave device.

10. The method in claim 1, wherein the real physical model is chosen from a geographic model, an architectural model, or a weather model.

11. The method in claim 1, wherein the at least one display device is chosen from an AR device, a VR device, a mobile phone or a computer.

12. The method of claim 1, wherein the at least one display device comprises at least one of:
　a local display device placed close to the real physical model,
　a remote display device placed distant from the real physical model.

13. The method of claim 1, wherein the identification graph is coplanar with at least one plane of the real physical model, and the direction information of the identification graph corresponds to a direction information of the at least one plane of the real physical model.

14. A system for augmented reality display of real physical model, comprising:
　a virtual model construction device, for constructing a virtual model from a real physical model using 3D reconstruction, wherein the real physical model is a model that occupies a real physical space;
　a combination device, for combining the virtual model and the real physical model, wherein the combination device further comprises:
　　a world coordinate system establishing module, for establishing a world coordinate system based on an identification graph, said identification graph being disposed adjacent to the real physical model, wherein a relative position between the identification graph and the real physical model is fixed, wherein the identification graph is a 2D graph and a direction information of the identification graph corresponds to a direction information of the real physical model; and
　　a virtual model world coordinate computing module, for computing the world coordinate of the virtual model under the established world coordinate system; and
　an augmented reality display device, for displaying an augmented reality scene of the real physical model.

15. The system of claim 14, the combination device further comprises:

a 3D point cloud constructing module, for extracting a plurality of feature points of the real physical model, and computing 3D coordinates of the plurality of feature points under the world coordinate system so as to form the 3D point cloud.

16. The system of claim 15, wherein the augmented reality display device further comprises:
  a 3D point cloud sharing module, for sending the 3D point cloud to at least one display device;
  a locating module, for locating movement of the at least one display device;
  a 3D rendering module, for rendering the virtual model displayed by the at least one display device based on the located movement thereof.

17. The system of claim 14, wherein a center of the identification graph is used as an origin of the world coordinate system, wherein the virtual model world coordinate computing module further comprises:
  a conversion unit, for computing a conversion coefficient between the real physical model's size and the algorithm's pixel size;
  a measuring unit, for measuring the relative position between the center of the identification graph and the center of the real physical model; and
  a computing unit, for computing world coordinates of the virtual model by converting the relative position to corresponding pixel size.

18. The system of claim 14, the virtual model constructing device further comprises:
  an image obtaining module, for obtaining 2D images of the real physical model;
  a calibrating module, for determining corresponding relations between the real physical model's size and the pixel size of 2D images;
  a feature extraction module, for extracting features of the real physical model;
  a stereo matching module, for establishing matching results between the 2D images based on said extracted features;
  a 3D reconstruction module, for reconstructing a the virtual model of the real physical model based on the matching results and the corresponding relations.

19. The system of claim 14, wherein the augmented reality display device further comprises an AR device, a VR device, a mobile phone or a computer.

20. The system of claim 14, wherein the augmented reality display device further comprises:
  an augmented reality scene control module, for allowing a user to control the augmented reality scene by interacting with the at least one display device.

21. The system of claim 20, wherein the augmented reality scene control module further comprises:
  a user control input unit, for receiving a gesture, voice, or head movement of the user.

22. The system of claim 20, wherein the at least one display device comprises:
  a master device and at least one slave device, wherein the master device controls the augmented reality scene, wherein each of the master device and at least one slave device is capable of displaying the augmented reality scene of the real physical model.

23. The system of claim 14, wherein the at least one display device comprises at least one of:
  a local display device placed close to the real physical model,
  a remote display device placed distant from the real physical model.

24. The system of claim 14, wherein the identification graph is coplanar with at least one plane of the real physical model, and the direction information of the identification graph corresponds to a direction information of the at least one plane of the real physical model.

* * * * *